Patented June 12, 1934

1,962,559

UNITED STATES PATENT OFFICE 1,962,559

NEW ALKALIMETAL-CUPRI-ALKALINO-CYANIDES

Hermann Hagenest, Wiesdorf-on-the-Rhine, and Friedrich Wilhelm Stauf, Cologne-Deutz-on-the-Rhine, Germany, assignors to I. G. Farbinindustrie Aktiengesellschaft, Frankfort-on-the-Main, Germany, a corporation of Germany No Drawing. Application October 30, 1929, Serial No. 403,652. In Germany November 7, 1928

5 Claims. (Cl. 23—77)

The present invention relates to new valuable alkalimetal-cupri-alkalino-cyanides and to a process for preparing same.

Our new compounds correspond probably to the general formula:

$$Alk_xCu(CN)_y \cdot A_z$$

wherein Alk means an alkalimetal, A stands for an alkalimetal or ammonia, $x$ and $y$ stand for 2 and 4 or 3 and 5 and $z$ stands for 1 or 2.

These compounds are prepared by reacting with a water-soluble copper salt upon ammonia or an alkali metal hydroxide in the molecular quantities indicated by the above formula and by admixing to the mixture obtained the respective quantity of water soluble cyanide at a temperature of between about 0 and 20° C.

The new compounds are stable only in watery solution and decompose while splitting off-cyanogen when the solution is evaporated even when working in vacuo. The weakly yellow colored watery solutions, however, are stable even at temperatures as high as 100° C.

These solutions are valuable media in combating insect pests and the like; but the chief application of these solutions is for preparing nitriles from aromatic diazo compounds by heating the diazo-compound with the solution of an alkalimetal - cupri - alkaline - cyanide to about 40-100° C.

Heretofore aromatic nitriles have been prepared by heating a solution of the respective diazo compound with a solution of potassium cupro cyanide of the formula $K_2CuCN_3$ to about 75-85° C. (compare Gattermann, Die Praxis des organischen Chemikers, 20 Aufl. 1927, page 262). We have found that about half the quantity of copper salt and also half the quantity of cyanogen can be saved by using our new cupri salts as nitrilization means.

According to the old process for every mol of the diazocompound 3 mols of potassium cupro cyanide are used, according to the equation:

$$CuSO_4 + 2KCN = CuCN + K_2SO_4 + 1/2(CN)_2,$$
$$CuCN + 2KCN = K_2Cu(CN)_3$$
$$K_2Cu(CN)_3 + C_6H_5N_2Cl =$$
$$C_6H_5CN + N_2 + KCl + KCN \cdot CuCN$$

while when using one of our new compounds, for instance, $K_3Cu(CN)_5 \cdot (NH_3)$ only 5/3 mols of the salt are used according to the equation:

$$K_3Cu(CN)_5 \cdot NH_3 + 3C_6H_5N_2Cl =$$
$$3KCl + 3C_6H_5CN + 1/2(CN)_2 + CuCN + NH_3.$$

Our invention is illustrated by the following examples without being limited thereto:

*Example 1.*—21.4 parts by weight of p-toluidine are diazotized in an ice cold hydrochloric acid solution with 14 parts by weight of sodium nitrite according to usual methods and introduced into a solution of a potassium-cupri-monamine-cyanide, obtainable by dissolving 25 parts by weight of crystallized copper sulfate in 100 parts by weight of water and introducing this solution into a solution consisting of 26 parts by weight of potassium cyanide of 100%, disolved in 50 parts by weight of water and 17.25 parts by weight of watery ammonia of 10%. The p-tolunitrile thus obtained is distilled off by steam distillation and rectified in the usual manner.

Yield: 19.5 parts by weight=83.4%.

*Example 2.*—18.6 parts by weight of aniline are diazotized in an ice cold hydrochloric acid solution with 14 parts by weight of sodium nitrite according to usual methods and introduced into a solution of a potassium-cupri-diammine-cyanide, obtainable by dissolving 25 parts by weight of crystallized copper sulfate in 100 parts by weight of water and introducing the solution into a solution consisting of 26 parts by weight of potassium cyanide of 100%, dissolved in 50 parts by weight of water and 34.5 parts by weight of ammonia of 10%. The benzonitrile thus obtained is distilled off by steam distillation and rectified in the usual manner.

Yield: 13.4 parts by weight=65%.

*Example 3.*—32.1 parts by weight of p-toluidine are diazotized in an ice cold hydrochloric acid solution with 21 parts by weight of sodium nitrite according to usual methods and introduced into a solution of a sodium-monamine-cupri-cyanide, obtainable by dissolving 25 parts by weight of crystallized copper sulfate in 100 parts by weight of water and introducing this solution into a solution of 24.5 parts by weight of sodium cyanide of 100%, dissolved in 50 parts by weight of water and 17.25 parts by weight of ammonia of 10%. The p-tolunitrile thus obtained is distilled off by steam distillation and rectified in the usual manner.

Yield: 29.25 parts by weight=83.4%.

We claim:

1. Process for preparing new alkalimetal-cupri-alkalino-cyanides of the probable general formula:

$$Alk_xCu(CN)_y \cdot A_z$$

wherein Alk stands for an alkalimetal, A stands for an alkalimetal or ammonia, $x$ and $y$ stand for 2 and 4 or 3 and 5 and $z$ stands for 1 or 2, which comprises adding to a watery solution of a copper salt an alkaline agent of the group consisting of alkali metal hydroxides and ammonia and introducing into this mixture a watery solution of an alkali metal cyanide at a temperature between about 0 and 20° C. and in the quantities indicated by the formula.

2. Process for preparing sodium-cupri-diammine-cyanide which comprises adding to a watery solution of 1 mol of crystallized copper sulfate, 2 mols of ammonia in form of ammonia water and introducing into this mixture a watery solution of 4 mols of sodium cyanide at about 10° C.

3. Process for preparing sodium-cupri-diammine-cyanide which comprises adding to a solution of 25 parts of crystallized copper sulfate in 100 parts by weight of water, 34.5 parts by weight of ammonia water of 10% strength and introducing into this mixture a solution of 24.5 parts of sodium cyanide of 100% strength in 50 parts by weight of water.

4. As new products aqueous solutions of alkali-metal-cupri-alkalino-cyanides of the probable general formula:

$$Alk_x\text{---}Cu(CN)_y \cdot A_z$$

wherein Alk means an alkalimetal, A stands for an alkalimetal or ammonia, $x$ and $y$ stand for 2 and 4 or 3 and 5 and $z$ stands for 1 or 2, being weakly yellowish solutions, which readily give off cyanogen and yielding with aromatic diazo compounds the respective nitriles and being valuable media in combating insect pests and the like.

5. As new products sodium-cupri-diammine-cyanide in watery solution of the probable formula:

$$Na_2Cu(CN)_4 \cdot 2NH_3$$

being yellowish liquors, readily giving off cyanogen and yielding with aromatic diazo-compounds the respective nitriles and being valuable media in combating insect pests and the like.

HERMANN HAGENEST.
FRIEDRICH WILHELM STAUF.